UNITED STATES PATENT OFFICE.

JOHN ALLEN HEANY, OF NEW HAVEN, CONNECTICUT, ASSIGNOR, BY MESNE ASSIGNMENTS, TO ROCKBESTOS PRODUCTS CORPORATION, A CORPORATION OF DELAWARE.

METHOD OF TREATING ASBESTOS.

1,407,686.  Specification of Letters Patent.  Patented Feb. 21, 1922.

No Drawing.  Application filed March 13, 1920.  Serial No. 365,497.

*To all whom it may concern:*

Be it known that I, JOHN ALLEN HEANY, a citizen of the United States, and a resident of New Haven, in the county of New Haven and State of Connecticut, have invented certain new and useful Improvements in Methods of Treating Asbestos, of which the following is a specification.

This invention relates to a method of treating asbestos preparatory to the formation of various useful products therefrom.

According to the method heretofore employed in preparing asbestos for the manufacture of yarn and other commercial products, the crude asbestos is first crushed in a "putty chaser" to separate the fibers and disintegrate the rock masses associated therewith. The product thus obtained, consisting of asbestos fibers, small rock particles and dust, is next put on an open reciprocating screen which sifts out the impurities, leaving a residue of substantially pure asbestos. A suitable proportion of cotton is then added to the asbestos and the mixture subjected to the action of a "cone willower" or a "picker", or, successively, to the action of both, whereby the asbestos and cotton fibers are thoroughly and uniformly intermingled, the resulting product consisting of a flocculent mass of asbestos and cotton fibers suitable for carding.

The method above described is satisfactory for the preparation of the more expensive grades of asbestos, such as the handworked material known in the art as "crude asbestos", which consists of bundles of relatively long fibers only partially separated from the rock masses with which they are associated in nature. Since the fibers are relatively long, the "crude asbestos", after having been crushed in the "putty chaser", can be readily screened to sift out the dust and small rock particles.

I have found, however, that this method cannot be successfully applied to asbestos of the cheaper grades such as are commonly known in commerce as "mill fiber." As is well known, "mill fiber" consists of asbestos fibers of various lengths mixed with a substantial proportion of dirt and dust. A large part of the fibers are so short that, were it attempted to screen the "mill fiber", an excessive amount of asbestos would escape with the dirt and dust through the meshes of the screen.

It is apparent, therefore, that the problem of purifying "mill fiber" asbestos, that is, segregating the asbestos from the dirt and dust intermixed therewith, is a difficult one. I have solved this problem, after much experimentation, by the simple expedient of consolidating the steps of cleaning the asbestos and mixing therewith the desired proportion of cotton. That is to say, instead of following the old process of first freeing the asbestos from the impurities associated therewith (which appears to be impracticable in the case of " mill fiber" asbestos), and then subsequently mixing cotton with the cleaned asbestos to produce a flocculent mass suitable for carding, I take the dirty "mill fiber", as it comes from the mines, and clean and mix it with cotton in one operation, thereby not only eliminating one of the steps of the old process, but also effecting substantial purification of the "mill fiber" without excessive asbestos losses. I am thus enabled to use a cheaper grade of asbestos than has been heretofore found feasible and to put this cheaper material in condition for carding by a process less complicated, and therefore less expensive to practice than is the process heretofore employed. My invention, therefore, effects a saving both in the cost of the raw material and in the cost of manufacture.

The method I preferably employ is as follows: I add to the impure " mill fiber " a suitable proportion of cotton, the per cent of cotton to be added depending upon the heat-resisting or other qualities desired in the ultimate product. For making yarn suitable to be made up into brake lining I usually add to the "mill fiber" four to ten per cent of cotton.

The "mill fiber," together with the cotton, is then run through a "cone willower," which effects a preliminary cleaning of the "mill fiber" and intermixture therewith of the cotton. The "cone willower" used in my process is of the ordinary well-known construction and need not, therefore, be described. The purpose of putting the cotton and asbestos through the "cone willower" is primarily to effect a breaking apart of the cotton fibers and to produce an approximately uniform mixture of the cotton and asbestos. Although some of the dirt and rock particles are sifted out in this operation, the product obtained still contains a considerable percentage of impurities.

The mixture of asbestos and cotton is next run through a "picker" of ordinary construction. Here the cotton and asbestos are beaten and picked apart in a screened receptacle while subjected to an air current, whereby the dust and other impurities are driven out through the meshes of the screen, and the cotton and asbestos in an initimately intermingled and flocculent condition are discharged into a separate receptacle or room.

The product obtained by the above-described process is a mass of intimately intermixed and entangled asbestos and cotton fibers substantially free of impurities and in suitable condition to be run through the carding machines.

The important result effected by simultaneously cleaning the asbestos and mixing therewith the cotton is that, because of the superior felting properties of the cotton, the fibers thereof catch and hold the short asbestos fibers, preventing escape thereof with the dust and other impurities during the cleaning and mixing operations, thus rendering it feasible to clean short-fibered asbestos without excessive asbestos losses.

It is not essential that the cotton and impure asbestos be treated successively in a cone willower and a picker. Substantially the same results may be obtained by subjecting the cotton and asbestos to the action of the cone willower alone or to the picker alone. The gist of the invention resides in the idea of cleaning the asbestos in the presence of a small percentage of cotton whereby the asbestos fibers become entangled with the cotton fibers which hold them from escaping with the impurities, and whereby the cotton and asbestos fibers are thoroughly and uniformly intermingled. I therefore do not limit the invention to the use of any particular kind of apparatus for performing the method described and hereinafter claimed.

While the process has been described as applied to the treatment of "mill-fiber" asbestos, it is, of course, not limited in its application to any particular grade of asbestos.

What I claim as new and desire to secure by Letters Patent is:

1. The process of treating materials in preparation for the manufacture of yarn which consists in combining the cleaning of asbestos as it comes commercially from the mines or while yet in an impure condition, and the incorporating therewith of cotton or other fibers, by putting the asbestos material and the cotton or other fibers at the same time or times through a machine which picks apart the fibers and mixes them in a flocculent condition and also eliminates impurities accompanying the uncleaned or only partially cleaned asbestos material.

2. The method of treating impure asbestos which consists in mixing asbestos with cotton and in subjecting the mixture to a cleaning operation in which a current of air is used to remove waste material.

3. The method of treating the cheaper grades of asbestos such as "mill fiber" which consists in mixing impure asbestos with a small percentage of cotton, and then beating and picking apart the asbestos and cotton fibers while passing therethrough an air current to remove the waste material.

4. The method of treating impure asbestos which consists in simultaneously cleaning asbestos and mixing therewith a small percentage of cotton, whereby the short asbestos fibers become entangled with the cotton fibers and are prevented from escaping with the impurities.

JOHN ALLEN HEANY.